(12) United States Patent
Benjamin

(10) Patent No.: US 9,438,286 B2
(45) Date of Patent: Sep. 6, 2016

(54) ACCURATE DESENSITIZATION ESTIMATION OF A RECEIVER

(71) Applicant: Ofer Benjamin, Petach-Tikva (IL)

(72) Inventor: Ofer Benjamin, Petach-Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/548,576

(22) Filed: Nov. 20, 2014

(65) Prior Publication Data

US 2016/0149602 A1 May 26, 2016

(51) Int. Cl.
| | |
|---|---|
| *H04B 1/10* | (2006.01) |
| *H04B 1/16* | (2006.01) |
| *H04B 15/00* | (2006.01) |
| *H04B 1/12* | (2006.01) |
| *H04W 4/00* | (2009.01) |
| *H04W 84/12* | (2009.01) |

(52) U.S. Cl.
CPC ............ *H04B 1/1027* (2013.01); *H04B 1/10* (2013.01); *H04B 1/12* (2013.01); *H04B 1/16* (2013.01); *H04B 15/00* (2013.01); *H04W 4/008* (2013.01); *H04W 84/12* (2013.01)

(58) Field of Classification Search
CPC ...... H04B 1/12; H04B 1/123; H04B 1/1027; H04B 1/10; H04B 1/16; H04B 15/00; H04W 4/008; H04W 84/12
USPC .......... 375/219, 295, 316, 324, 346
See application file for complete search history.

(56) References Cited

U.S. PATENT DOCUMENTS

| | | | |
|---|---|---|---|
| 8,285,241 B2* | 10/2012 | Mirzaei | H04B 1/28 455/318 |
| 2008/0146183 A1* | 6/2008 | Gebara | H01Q 1/521 455/295 |
| 2009/0323652 A1* | 12/2009 | Chen | H04B 1/406 370/338 |
| 2012/0164948 A1 | 6/2012 | Narasimha et al. | |
| 2012/0178386 A1 | 7/2012 | Pascolini et al. | |
| 2013/0044621 A1 | 2/2013 | Jung et al. | |
| 2014/0073258 A1* | 3/2014 | Burchill | H04B 1/12 455/63.1 |

OTHER PUBLICATIONS

Extended European Search Report received for European Patent Application No. 15190308.5, mailed on Apr. 6, 2016, 9 pages.

\* cited by examiner

*Primary Examiner* — Freshteh N Aghdam
(74) *Attorney, Agent, or Firm* — Forefront IP Lawgroup, PLLC

(57) ABSTRACT

Described herein are technologies related to an implementation of de-sensitization estimation in a receiver of a portable device.

18 Claims, 3 Drawing Sheets

ACCURATE DESENSITIZATION ESTIMATION OF A RECEIVER

BACKGROUND

Wireless communication systems may use one or more channels to transfer data between a transmitter and receivers. These communication systems may operate according to a set of standards defined by the Institute of Electrical and Electronics Engineers (IEEE) 802.11 committee for Wireless Local Area Network (WLAN) communication.

During the transfer of data between the transmitter and receivers, multipath problems and other conditions such as a presence of noises, harmonic spurs, etc. may affect data-throughput or the reception of data packets. For example, the presence of the harmonic spurs that may mix with the receiving of the data packets may cause problems with signal detecting, amplifier gain adjustment, and signal decoding. To this end, wireless communication systems may employ various techniques such as de-sensitization estimation to identify these problems and take the necessary actions.

Mass production of radio products may include significant variance over process of their radio frequency (RF) component parameters. A known solution for this significant variance includes the de-sensitization estimation based on a limited set of pre-engineered coefficients (e.g., transmission out-of-band noise), which are usually correlated with typical process components. However, challenges may arise in generating different sets of coefficients per process due to the complexity of having over-process characterization, as well the process detection itself, of each component.

DETAILED DESCRIPTION

Described herein is a technology for implementing an accurate de-sensitization estimation in a receiver of a portable device. Particularly, during a module production for the receiver of the portable device.

For example, the receiver of the portable device includes a first module (e.g., cellular module) and a co-running second module (e.g., Wi-Fi and/or Bluetooth modules). In this example, the first module is configured to transmit its desired signal during a calibration process, and the second module is configured to perform a de-sensitization estimation based on the additional, undesirable noise, of the aggressor transmitter, created by the first module transmitted signal.

In an implementation, the second module performs the de-sensitization estimation by taking into considerations a residual out-of-band noise, spurious signals or harmonic frequencies, and other conditions from the first module that transmitted the desired signal. In addition, the second module performs the de-sensitization estimation by adding filter insertion losses, amplification noise, and in-channel blocking effects at the second module. Thus, a total distortion may include factors and conditions derived from the first module out-of-band emissions and the second module.

Figure 1:
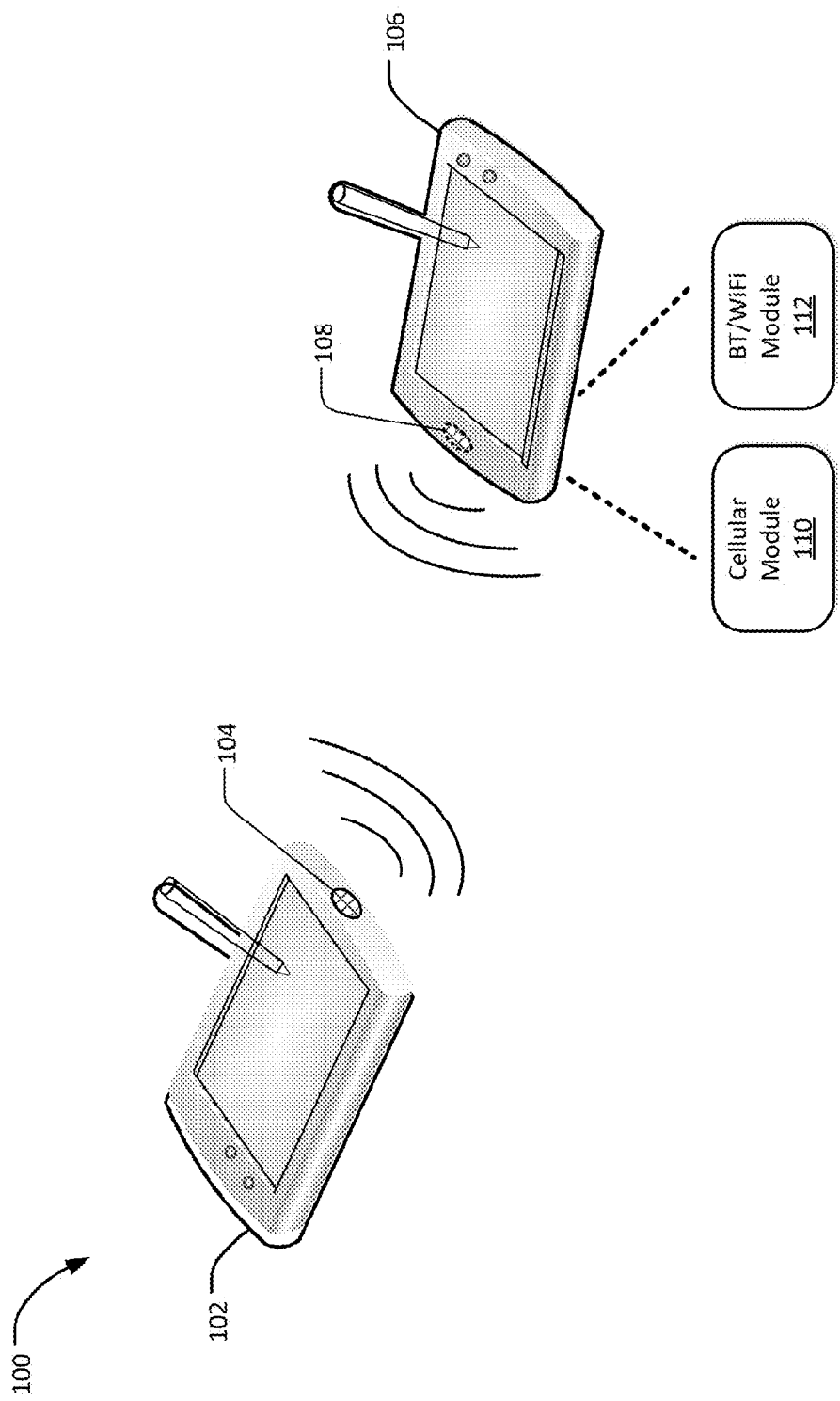
FIG. 1 illustrates an example scenario that implements a use of accurate de-sensitization estimation in a portable device.

FIG. 1 is an example scenario 100 that utilizes an accurate desensitization estimation in a receiver circuitry or system of a portable device. The scenario 100 shows a portable device 102 with an antenna 104, and another portable device 106 with an antenna 108. A transmitted signal generated in the platform of device 106 propagates through the antenna 108.

The portable devices 102 or 106 may include, but are not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The portable device 102, for example, may communicate with the other portable device 106 in a network environment. The network environment, for example, includes a cellular network configured to facilitate communications between the portable device 102 and the other portable device 106.

During this cellular network communications, cellular uplink transmissions, for example, from a cellular module 110 of the portable device 102 may interfere with its "on-platform" Bluetooth (BT) and Wi-Fi companion receivers. The BT and Wi-Fi estimation feature may be implemented by a BT and/or a Wi-Fi module 112 within the same portable device 102.

Thus, the implementations described herein may facilitate the accurate estimation of distortions or desensitization effects, for example, of the interfering cellular uplink transmissions to BT and Wi-Fi wireless communications. For example, total distortions between the transmitting cellular module and components of the Wi-Fi module may be estimated at the Wi-Fi module side during module productions. In this example, the total distortions may be estimated, for example, during the chip or system production in order to facilitate maximum throughput in the receiver circuitry or system of the portable device 102. In another example, the total distortions between the transmitting cellular module and components of the BT module may be estimated at the BT module side. In this example, the BT module may decide to avoid specific channels based on the estimated total distortions.

Figure 2:
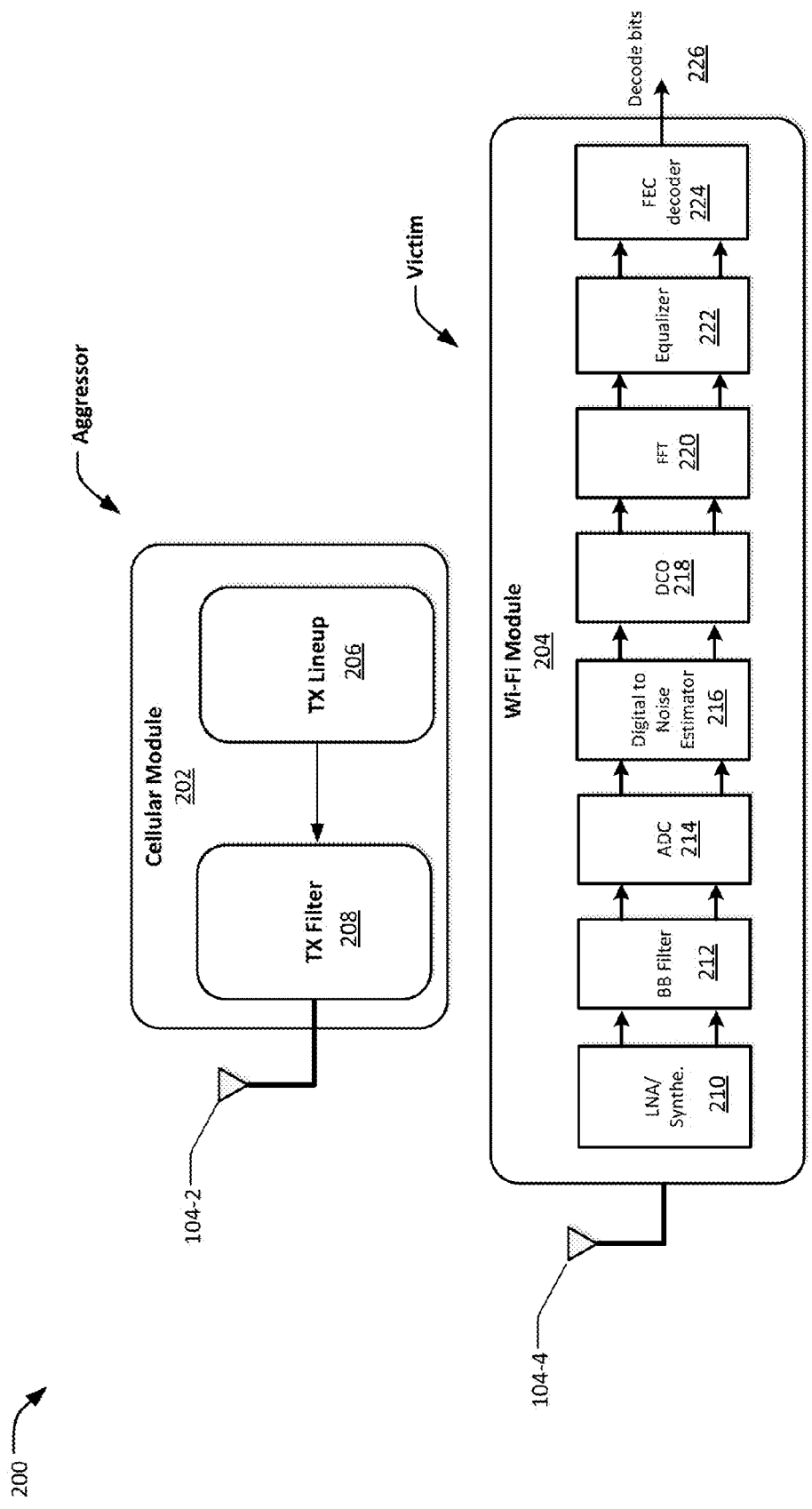
FIG. 2 illustrates an example block diagram of a portable device receiver in accordance with implementations described herein.

FIG. 2 is an example schematic block diagram of a portable device receiver 200. The portable device receiver 200 may include a first module such as a cellular module 202, and a second module such as a Wi-Fi module 204. In this example block diagram, the cellular module 202 may be treated as an aggressor component, while the Wi-Fi module 204 may be treated as a victim component. In other words, an operation of the cellular module 202 may cause distortions and/or de-sensitizations to the Wi-Fi module 204.

The aggressor cellular module 202 further includes a transmission line-up 206 and a transmission filter 208. On the other hand, the victim component Wi-Fi module 204 may further include a low-noise amplifier (LNA) and synthesizer 210, a baseband (BB) filter 212, an analog-to-digital converter (ADC) 214, a digital-to-noise estimator 216, a digital crystal oscillator (DCO) 218, a Fast Fourier Transform (FFT) 220, an equalizer 222, a forward-error-correction (FEC) decoder 224, and decoded bits 226. It is also to be understood that portable receiver 200 may include one or more processors and one or more memory components for the implementations as described herein.

As an example of present implementations herein, the cellular module 202 is configured to transmit a signal such as for example, a desired uplink transmission. In this example, the signal transmitted may undergo amplifications in one or more stages of amplifier (not shown) at the transmission line-up 206. The one or more stages of amplifier, for example, may produce out-of-band noise that may cross all the way to the Wi-Fi module 204. The out-of-band noise, for example, may be due to non-linearity and other conditions present within the one or more stages of amplifiers in cellular module 202.

The configuration of the cellular module 202 as described above may be implemented during a calibration process in the chip production or system manufacturing. For example, the configured desired signal or uplink transmission is utilized as a test signal for the cellular module 202 during the calibration process. In this example, the desired signal may undergo further processing in the transmission line-up 206 and the transmission filter 208 prior to its emission through a first antenna 104-2.

After the amplification process at the transmission line-up 206, the amplified desired signal may be filtered by the transmission filter 208.

For example, the transmission filter 208 may be configured to reject the out-of-band noise of amplified desired signal due to the amplification process at the transmission line-up 206. In this example, residual out-of-band noise and other harmonic signals may still end up in the co-running Wi-Fi module 204 (i.e., second module). As such, the cellular module 202 may act or is considered as the aggressor due to its capability of producing interfering out-of-band noise and other harmonic signals. The Wi-Fi module 204 may act or is considered as the victim component, because of the distortions or de-sensitizations that may be created by the out-of-band noise of the cellular module 202, and from other non-linearity effects created inside the Wi-Fi module 204.

With continuing reference to the Wi-Fi module 204, the out-of-band or residual out-of-band noise and other harmonic signals may be received by the Wi-Fi module 204 through antenna 104-4. These noise and signals may be received at the same time with the receiving of the RF signals by the Wi-Fi module 202 and as such, distortions and de-sensitizations may result in the Wi-Fi module 204.

In an implementation, out-of-band noise at the transmission line-up 206, residual out-of-band noise and other harmonic signals remain post the transmission filter 208, antenna isolations between the antennas 104-2 and 104-4, and other conditions that may generate harmonic spurs in the cellular module 202 are considered by the digital to noise estimator 216 in estimating total distortions.

With the received RF signals as discussed above, amplification of the received RF signals, for example, is implemented by the LNA 210. In this example, the amplified received or inbound RF signals are further down-converted and filtered by the BB filter 212 to produce baseband signals.

The ADC 214 may then convert the baseband signals from an analog domain into digital domain to produce digital baseband signals. At this stage, the baseband signals include the residual out-of-band noise and other spurious signals generated by the co-running cellular module 202. The residual out-of-band noise and the spurious signals or interfering harmonic frequencies, for example, may produce de-sensitizations in the Wi-Fi module 104. In this example, the baseband signals may still be reconstructed and/or demodulated; however, the harmonic frequencies from the uplink transmissions may cause the de-sensitivity of the Wi-Fi module 104 to reach about 40 dB. By using the digital to noise estimator feature as described herein, the de-sensitivity estimation inaccuracy of the Wi-Fi module may be significantly reduced, down to 1 dB, or even lower.

As an example of present implementations herein, the digital to noise estimator 216 may further estimate filter insertion losses at front-end components of the Wi-Fi module 204. For example, prior to conversion of the analog baseband signals into digital baseband signals, insertion losses due to low-pass filtering, down-sampling, etc. may be considered by the digital to noise estimator 216 in estimating the total distortions. In this example, other losses due to amplifications and in-channel blocking effects are further included in the total distortions estimation.

With the estimated total distortions, a corrective algorithm may be performed to eliminate or lessen the effects of these distortions during demodulation of the baseband signals. For example, a low-pass filtering may be switched on the first module to attenuate higher-order harmonic signals created by the uplink transmissions in the cellular module 204. In another example, prior to the decoding by the FEC decoder 224, nulling of tone bins containing a high confidence level of spurious signals may be implemented.

As shown in FIG. 2, the demodulation of the baseband signal may be implemented by the DCO 218, FFT 220, equalizer 22, and the FEC decoder 224 to produce the decode bits 226.

In other implementations such as, in a case of the BT module, the BT module may utilize an adaptive frequency hopping (AFH) based on above discussed estimation of total distortions. Typically, the AFH allows the BT module to adapt to the environment by identifying fixed sources of interference and excluding them from the list of available channels. This process of re-mapping may involve reduction of the number of channels to be used by the BT module.

In an implementation, the AFH may set aside channel or channels that include harmonic spurs. For example, the digital to noise estimator 216 may identify one or more channels that contain interfering harmonic spurs. In this example, the BT module may utilize the channels that were not affected by the interfering harmonic frequencies generated by the cellular module 202 and other internal components of the BT module.

Although the example portable device receiver 200 illustrates in a limited manner basic components of the receiver of the portable device, other components such as battery, one or more processors, SIM card, memory, including computer-readable media, etc. were not described in order to simplify the embodiments described herein.

Figure 3:
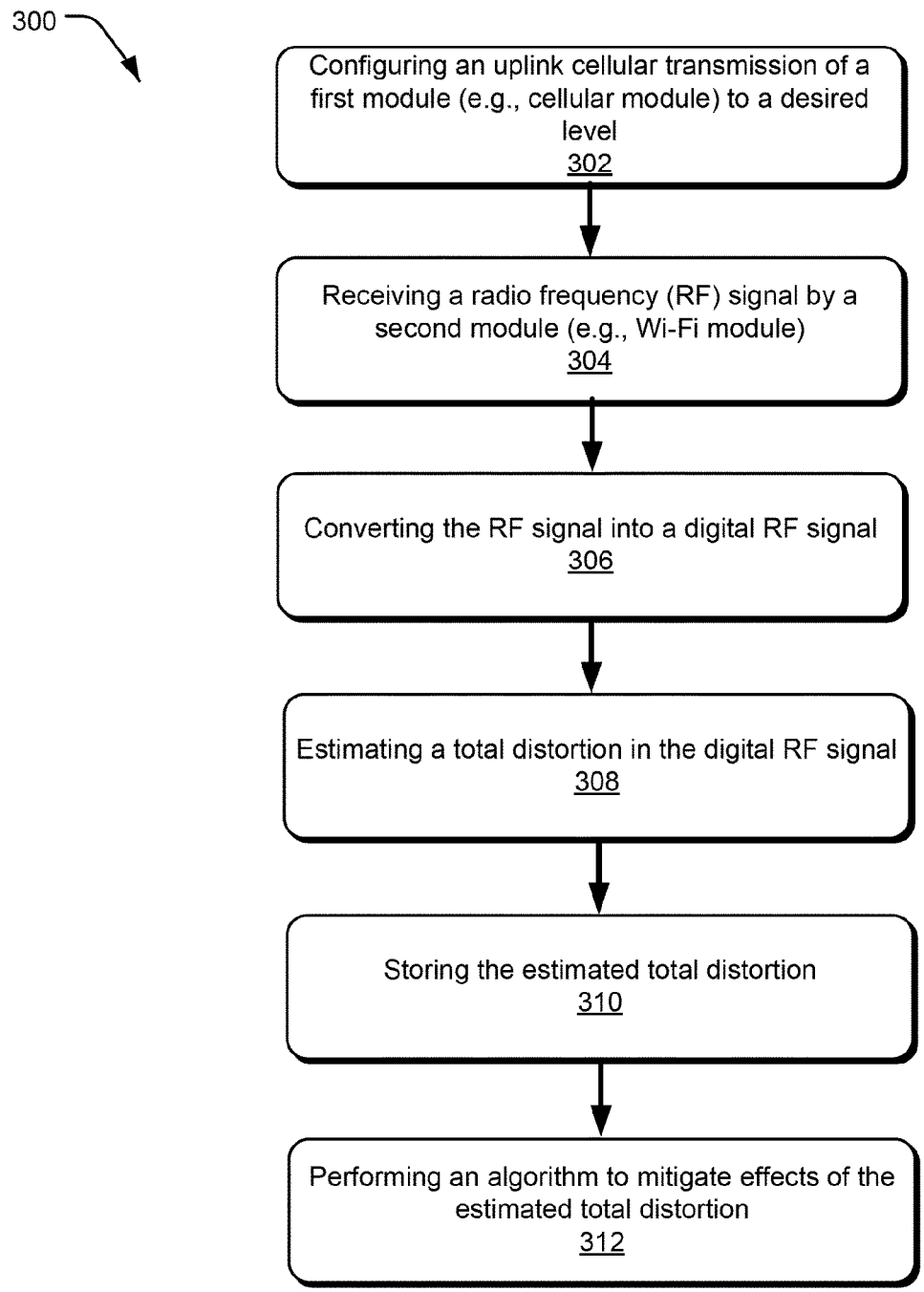
FIG. 3 illustrates an exemplary process for implementing an accurate de-sensitization estimation in accordance with implementations described herein.

FIG. 3 shows an example process flowchart 300 illustrating an example method for an accurate de-sensitization estimation of a receiver in a portable device. The de-sensitization estimation, for example, includes out-of-band noise, harmonic frequencies, and other conditions present during co-running of cellular module, Wi-Fi module and the BT module within the same portable device. In certain implementations, over N channels and/or M Transmit power levels.

The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 302, configuring an uplink transmission of a first module to a desired level is performed. For example, the first module may include the cellular module 202 that is configured to transmit a signal to a desired level. In this example, the cellular module 202 may transmit the signal that is a test signal during a calibration process performed in the chip or system production.

At block 304, receiving of a RF signal by a second module during the uplink cellular transmission is performed. For example, the Wi-Fi module 204, which is the second module, receives the RF signals through its antenna 104-4. In this example, out-of-band noise or residual out-of-band noise and other harmonic signals produced by components of the first module are also received by the Wi-Fi module 204 through the antenna 104-4. These noise and signals may be received at the same time with the receiving of the RF signals by the Wi-Fi module 202 and as such, distortions and de-sensitizations may result in the Wi-Fi 204.

At block 306, converting the RF signal into a digital RF signal by the second module. For example, the LNA 210 may implement amplification of the received RF signals. Furthermore, the amplified received or inbound RF signals are further down-converted and filtered by the BB filter 212 to produce the baseband signals. Thereafter, the ADC 214 may then convert the baseband signals from an analog domain into digital domain to produce digital baseband signals.

In an implementation, the digital baseband signals include the residual out-of-band noise and other spurious signals generated by the co-running cellular module 202. The residual out-of-band noise and the spurious signals or interfering harmonic frequencies, for example, may produce de-sensitizations to the Wi-Fi module 104. In this example, the baseband signals may still be reconstructed and/or demodulated; however, the harmonic frequencies from the uplink transmissions may cause the de-sensitivity of the Wi-Fi module 104 to reach up to 40 dB. By using the digital to noise estimator feature as described herein, the de-sensitivity inaccuracy of the Wi-Fi module may be significantly reduced, down to 1 dB, or even lower.

At block 308, estimating a total distortion in the digital RF signal is performed. For example, the digital to noise estimator 216 may estimate distortions produced by the configured transmitted test or desired signal from the first module to the second module. The distortions in the first module may include residual out-of-band noise, spurious signals or harmonic frequencies, and other conditions. On the other hand, the distortions in the second module may include filter insertion losses, amplification noise, and in-channel blocking effects at front-end components of the Wi-Fi module 204.

At block 310, storing the estimated total distortion is performed.

At block 312, performing a corrective algorithm to mitigate effects of the estimated total distortion is performed. For example, prior to the decoding by the FEC decoder 224, nulling of tone bins containing a high confidence level of spurious signals may be implemented. In this example, the corrective algorithm may be implemented by one or more processors within the portable device.

Accordingly, the second module such as the Wi-Fi module 204 may decide to switch its operation channel to another channel, which is estimated to be less desensitized while in concurrent operation with a specific blocker. This operation of the Wi-Fi module 204 may further apply in "soft AP," or "Wi-Fi Direct" operations.

In other implementations, the second module may include the BT module. For example, the BT module may select channels through AFH process by taking into consideration the channel or channels with no interfering noises or harmonic frequencies as discussed above.

The following examples pertain to further embodiments:

Example 1 is a method of de-sensitization estimation comprising: configuring an uplink transmission of a first module to a desired level; receiving a radio frequency (RF) signal by a second module during the uplink transmission; converting the RF signal into a digital RF signal by the second module; estimating a total distortion in the digital RF signal, the total distortion having harmonic spurs due to co-running of the first and second modules; and performing correction of the digital RF signal to mitigate effects of the estimated total distortion.

In example 2, the method as recited in example 1, wherein the configuring of the uplink transmission includes setting one or more stages of an amplifier in the first module to a desired level, wherein an out-of-band noise is produced by the one or more stages of the amplifier.

In example 3, the method as recited in example 1, wherein the estimating of the total distortion is based at least upon the out-of-band noise that is received by the second module.

In example 4, the method as recited in example 1, wherein the configuring of the uplink transmission includes configuring a filter to reject an out-of-band noise in the first module, wherein the filtering of the out-of-band noise rejection creates an additional distortion.

In example 5, the method as recited in example 1, wherein the estimating of the total distortion is based at least upon the additional distortion created by the filtering of the out-of-band noise.

In example 6, the method as recited in example 1, wherein the estimating of the total distortion is based at least upon an antenna isolation between a first antenna of the first module and a second antenna of the second module.

In example 7, the method as recited in example 1, wherein the digital RF signal includes a receiver filter insertion loss due to components of the second module.

In example 8, the method as recited in example 1, wherein the estimating of the total distortion is based at least upon the receiver filter insertion loss.

In example 9, the method as recited in example 1, wherein the digital RF signal includes receiver in-channel blocking effects.

In example 10, the methods as recited in any of examples 1-9, wherein the first module is a cellular module and wherein the second module is a Wi-Fi module or a Bluetooth (BT) module.

Example 11 is a device receiver comprising: a first module configured to transmit a signal to a desired level; a second module configured to receive a radio frequency (RF) signal during the transmission of the signal by the first module, the second module further comprises: an analog-to-digital converter (ADC) that converts the received RF signal into a digital RF signal; a digital noise estimator configured to estimate a total distortion in the digital RF signal, the total distortion includes harmonic spurs due to co-running of the first and second modules; and a memory to store the estimated total distortion.

In example 12, the device as recited in example 11, wherein the first module further comprises one or more stages of an amplifier that produces an out-of-band noise, wherein the out-of-band noise is included in the digital RF signal received by the first module.

In example 13, the device as recited in example 11, wherein the first module is a cellular module and wherein the second module is a Wi-Fi module or a Bluetooth (BT) module.

In example 14, the device as recited in example 11, wherein the first module further comprises a filter to reject an out-of-band noise in the first module, wherein the out-of-band noise creates an additional distortion in the second module.

In example 15, the device as recited in example 11, wherein the digital to noise estimator is configured to estimate the total distortion based at least upon the additional distortion created by filter out-of-band noise rejection to the second module.

In example 16, the devices as recited in any of any of examples 11-15, wherein the digital noise estimator is configured to estimate the total distortion based at least upon the out-of-band noise included in the received digital RF signal.

Example 17 is one or more non-transitory computer-readable media storing processor-executable instructions that when executed cause one or more processors to perform operations comprising: configuring a first module to transmit a signal to a desired level; receiving of a radio frequency (RF) signal by a second module during the transmission of the signal; converting the RF signal into a digital RF signal by the second module; estimating a total distortion in the digital RF signal by the second module; and performing a correction to mitigate effects of the estimated total distortion.

In example 18, the one or more non-transitory computer-readable media of example 17, wherein the configuring of the signal to be transmitted includes setting of one or more stages of an amplifier in the first module to a desired level, wherein an out-of-band noise is produced by the one or more stages of amplifier.

In example 19, the one or more non-transitory computer-readable media of example 17, wherein the first module is a cellular module while the second module is a Wi-Fi module or a Bluetooth (BT) module, the first and second modules are components of a single device.

In example 20, the one or more computer-readable media according to any of examples 17-20, wherein the estimating of the total distortion is based at least upon the out-of-band noise that is received by the second module.

What is claimed is:

1. A method of de-sensitization estimation comprising:
   configuring an uplink transmission of a first module to a desired level;
   filtering of an out-of-band noise by the first module, wherein the filtering generates a residual out-of-band noise from the first module;
   receiving a radio frequency (RF) signal and the residual out-of-band noise by a second module during the uplink transmission;
   converting the RF signal into a digital RF signal by the second module;
   estimating a total distortion in the digital RF signal by the second module, the total distortion comprising the residual out-of-band noise and harmonic spurs due to co-running of the first and second modules; and
   performing correction of the digital RF signal by the second module to cancel the estimated total distortion wherein the first module is a cellular module and wherein the second module is a Wi-Fi module or a Bluetooth (BT) module.

2. The method as recited in claim 1, wherein the configuring of the uplink transmission includes setting one or more stages of an amplifier in the first module to a desired level, wherein the out-of-band noise is produced by the one or more stages of the amplifier.

3. The method as recited in claim 2, wherein the estimating of the total distortion is based at least upon the out-of-band noise that is received by the second module.

4. The method as recited in claim 1, wherein the configuring of the uplink transmission includes configuring a filter to reject the out-of-band noise in the first module, wherein the filtering of the out-of-band noise rejection creates an additional distortion.

5. The method as recited in claim 4, wherein the estimating of the total distortion is based at least upon the additional distortion created by the filtering of the out-of-band noise.

6. The method as recited in claim 1, wherein the estimating of the total distortion is based at least upon an antenna isolation between a first antenna of the first module and a second antenna of the second module.

7. The method as recited in claim 1, wherein the digital RF signal includes a receiver filter insertion loss due to components of the second module.

8. The method as recited in claim 7, wherein the estimating of the total distortion is based at least upon the receiver filter insertion loss.

9. The method as recited in claim 1, wherein the digital RF signal includes receiver in-channel blocking effects.

10. A device receiver comprising:
    a first module configured to transmit a signal to a desired level, wherein the signal undergoes an out-of-band noise filtering to generate a residual out-of-band noise from the first module;
    a second module configured to receive a radio frequency (RF) signal and the residual out-of-band noise during the transmission of the signal by the first module, the second module further comprises:
        an analog-to-digital converter (ADC) that converts the received RF signal into a digital RF signal;
        a digital noise estimator configured to estimate a total distortion in the digital RF signal, the total distortion includes the residual out-of-band noise from the first module and harmonic spurs due to co-running of the first and second modules;
        a memory to store the estimated total distortion; and
        a processor configured to perform a corrective algorithm to cancel the estimated total distortion wherein the first module is a cellular module and wherein the second module is a Wi-Fi module or a Bluetooth (BT) module.

11. The device receiver as recited in claim 10, wherein the first module further comprises one or more stages of an amplifier that produces the out-of-band noise.

12. The device receiver as recited in claim 11, wherein the digital noise estimator is configured to estimate the total distortion based at least upon the residual out-of-band noise included in the received digital RF signal.

13. The device receiver as recited in claim 10, wherein the first module further comprises a filter to reject the out-of-band noise in the first module, wherein the filtered out-of-band noise creates an additional distortion in the second module.

14. The device receiver as recited in claim 13, wherein the digital to noise estimator is configured to estimate the total distortion based at least upon the additional distortion created by filtering the out-of-band noise rejection on the first module.

15. One or more non-transitory computer-readable media storing processor-executable instructions that when executed cause one or more processors to perform operations comprising:
- configuring a first module to transmit a signal to a desired level;
- filtering of an out-of-band noise by the first module, wherein the filtering generates a residual out-of-band noise from the first module;
- receiving of a radio frequency (RF) signal and the residual out-of-band noise by a second module during the transmission of the signal;
- converting the RF signal into a digital RF signal by the second module;
- estimating a total distortion in the digital RF signal by the second module, wherein the total distortion includes at least the residual out-of-band noise from the first module; and
- performing a correction by the second module to mitigate effects of the estimated total distortion wherein the first module is a cellular module while the second module is a Wi-Fi module or a Bluetooth (BT) module.

16. The one or more computer-readable media according to claim 15, wherein the configuring of the signal to be transmitted includes setting of one or more stages of an amplifier in the first module to the desired level, wherein the out-of-band noise is produced by the one or more stages of amplifier.

17. The one or more computer-readable media according to claim 15, wherein the first and second modules are components of a single device.

18. The one or more computer-readable media according to claim 15, wherein the estimating of the total distortion is based at least upon a receiver filter insertion loss.

* * * * *